(12) United States Patent
Vincent et al.

(10) Patent No.: US 7,030,175 B2
(45) Date of Patent: Apr. 18, 2006

(54) INK JET LATEX HAVING REACTIVE SURFACTANT STABILIZATION

(75) Inventors: Kent Vincent, Cupertino, CA (US); Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 207 days.

(21) Appl. No.: 10/360,474

(22) Filed: Feb. 6, 2003

(65) Prior Publication Data

US 2004/0157958 A1    Aug. 12, 2004

(51) Int. Cl.
*C09D 11/10* (2006.01)
*C08K 9/04* (2006.01)
*C08L 25/08* (2006.01)

(52) U.S. Cl. .............. 523/160; 523/200; 524/577

(58) Field of Classification Search ............... 523/160, 523/161; 524/556, 560, 577
See application file for complete search history.

(56) References Cited

U.S. PATENT DOCUMENTS

| | | | |
|---|---|---|---|
| 4,224,455 A | 9/1980 | Deutsch | |
| 5,714,538 A | 2/1998 | Beach et al. | |
| 5,719,204 A | 2/1998 | Beach et al. | |
| 5,807,922 A | 9/1998 | Thames et al. | |
| 5,962,412 A | 10/1999 | Hogan, Jr. | |
| 5,965,634 A * | 10/1999 | Idogawa et al. | 523/161 |
| 5,977,210 A | 11/1999 | Patel et al. | |
| 6,160,040 A | 12/2000 | Ghosh | |
| 6,180,691 B1 | 1/2001 | Cheng et al. | |
| 6,211,282 B1 | 4/2001 | Yamashita et al. | |
| 6,277,933 B1 | 8/2001 | Wade | |
| 6,541,590 B1 * | 4/2003 | Johnson et al. | 526/281 |
| 6,548,571 B1 * | 4/2003 | Cheng et al. | 523/160 |
| 2002/0156156 A1 * | 10/2002 | Gore | 523/161 |
| 2003/0029355 A1 * | 2/2003 | Miyabayashi | 106/31.27 |
| 2003/0149133 A1 * | 8/2003 | Lau et al. | 523/160 |
| 2004/0112525 A1 * | 6/2004 | Pereira et al. | 156/292 |

OTHER PUBLICATIONS

Brandup, J., Immergut E.H., and Grulke, E.A.; Polymer Handbook, 4th Ed., John Wiley & Sons, New York, 1999 (pp. III/8-III/17 and III/34-III/35).*

* cited by examiner

*Primary Examiner*—Callie Shosho

(57) ABSTRACT

Latex particles having a reacttive surfactant covalently bonded to the latex particle surface are provided. The latex particles exhibit shear stability and accurate drop placement on printed media when used in ink jet inks and in high speed ink jet printers. A latex particle is also provided having a reactive surfactant covalently bonded to the surface of the latex particle, where the latex particle has a bulk density from 0.90 $g/cm^3$ to 1.10 $g/cm^3$ and a surface dielectric constant from 2.0 to 3.0. An ink-jet ink is provided that can comprise effective amounts of an ink vehicle, a colorant admixed in the ink vehicle, latex particles dispersed in the ink vehicle, and a reactive surfactant covalently bonded to the surface of the latex particles.

20 Claims, No Drawings

INK JET LATEX HAVING REACTIVE SURFACTANT STABILIZATION

FIELD OF THE INVENTION

The present invention relates generally to ink-jet printing with latex polymer containing inks. More particularly, the present invention relates to high-drop frequency ink jet inks having a reactive surfactant covalently bonded to the latex particle surface.

BACKGROUND OF THE INVENTION

The majority of commercial ink-jet inks are water-based. Thus, their constituents are generally water-soluble, as in the case with many dyes, or water dispersible, as in the case with pigments. Furthermore, ink-jet inks have low viscosity (typically 5 cps or less.

In addition to the typical color and general image fade issues that occur in many ink-jet ink systems, ink-jet prints have also been known for poor durability when exposed to water or high humidity. This results from the use of water-soluble and water dispersible colorants within the water-based ink. In response to this problem, latex polymers that are compatible with ink jet inks have been incorporated with the inks. The latex can consist of small micron or submicron hydrophobic polymeric particles of high molecular weight that are dispersed in the aqueous ink-jet ink. When printed as part of an ink-jet ink, a latex component of the ink can form a film on a media surface, entrapping and protecting the colorant within the hydrophobic print film.

However, such latex compositions can create problems with respect to pen reliability. Inks containing a latex component typically have a drop velocity decrease as the drop ejection frequency of the ink jet pen is increased beyond a certain value. The velocity reduction negatively impacts drop placement accuracy on the printed media within a moderate frequency range. At higher frequencies, the velocity reduction mechanism prevents drop ejection altogether, which can lead to agglomeration of the ink on the printer nozzle. In view of the foregoing, there remains a need in the art for latex particles that are thermal shear stable, and for inks that can be used in high speed ink jet printers that exhibit good drop placement accuracy on the print media and stable drop ejection at high drop frequencies.

SUMMARY OF THE INVENTION

The latex particles of the present invention are highly functional for use with ink-jet inks. In one embodiment, a latex particle is provided having a reactive surfactant covalently bonded to the latex particle surface. In another embodiment of the invention, a latex particle is provided having a reactive surfactant covalently bonded to the surface of the latex particle, where the latex particle has a bulk density from 0.90 g/cm$^3$ to 1.10 g/cm$^3$ and a surface dielectric constant from 2.0 to 3.0.

These latexes can be used in ink-jet inks or with other predominantly water-based compositions. More specifically, an ink-jet ink is provided that can comprise effective amounts of an ink vehicle; a colorant admixed in the ink vehicle; latex particles dispersed in the ink vehicle; and a reactive surfactant covalently bonded to the surface of the latex particles. The latex particles can have a bulk density of from about 0.90 g/cm$^3$ to about 1.10 g/cm$^3$ and/or a surface dielectric constant of from about 2.0 to about 3.0.

In still another embodiment, an ink-jet ink is also provided comprising effective amounts of an ink vehicle having a liquid density; a colorant admixed in the ink vehicle; and latex particles dispersed in the ink vehicle, wherein the latex particles have a reactive surfactant covalently bonded to the surface thereof and wherein the latex particles have a bulk density from substantially the same as the liquid density to 0.1 g/cm$^3$ greater or lower than the liquid density.

Additional features and advantages of the invention will be apparent from the detailed description that follows which illustrates, by way of example, features of the invention.

DETAILED DESCRIPTION

The present invention relates to latex particles having a covalently bonded reactive surfactant on the latex particle surface, and further relates to ink jet inks having such latex particles therein.

It is understood that certain terminology used herein is used for the purpose of describing particular embodiments only and are not intended to be limiting. For example, as used in this specification and the appended claims, the singular forms "a," "an," "at least one," and "the" include plural referents unless the context clearly dictates otherwise.

As used herein, "liquid vehicle" or "ink vehicle" refers to the fluid in which colorants and latex particles or colloids are dispersed to form ink-jet inks. Suitable liquid vehicles and vehicle components include any agents known in the art. By way of example, typical ink vehicles may include a variety of different agents, such as surfactants, co-solvents, buffers, biocides, sequestering agents, viscosity modifiers, and water.

As used herein, "colorant" can include dyes, pigments, and/or other particles that are compatible with and that may be suspended in an ink vehicle having the latex of the present invention. Pigments that can be used include self-dispersed pigments and polymer dispersed pigments. Self-dispersed pigments may include those that have been chemically surface modified with a charge or a polymeric grouping, which can aid the pigment in becoming and/or substantially remaining dispersed in a liquid vehicle. The pigment can also be a polymer-dispersed pigment that utilizes a dispersant (which can be a polymer or an oligomer or a surfactant) in the liquid vehicle and/or in the pigment that utilizes a physical coating to aid the pigment in becoming and/or substantially remaining dispersed in a liquid vehicle. With respect to the other particles that can be used, examples include magnetic particles, aluminas, silicas, and/or other ceramics, metallics, or organo-metallics, whether or not such particles impart color.

As used herein, "effective amount" refers to at least the minimal amount of a substance or agent, which is sufficient to achieve a desire effect. Amounts, concentrations, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited.

As used herein, the term "freqcel" denotes a reduction in ink drop ejection velocity with increased pen firing frequency. As previously described, a lowering of drop velocity can lead to changes in the trajectory of the fired drops, resulting in a reduction of drop placement accuracy on the print media.

The term "decel" denotes an increase in ink flow resistance within pen micro-channels, which in turn, reduces ejected drop volume. Such flow resistance can be caused by changes in ink rheology or plugged channels, and is often responsible for ink starvation within a pen firing chamber. The term "decap" is a measure of how long a nozzle may remain inactive before plugging and how many pen firings are required to re-establish proper drop ejection.

Generally, the term "reactive surfactant" means any surfactant (e.g., surfmer, non-migratory surfactant, etc.) that has the ability to fix itself onto the surface of a latex particle, such as, for example, by formation of a covalent bond. Typically, the reactions between reactive surfactants and the latex particle surface are sufficiently strong to prevent separation and migration therebetween. Generally, the term "nonreactive surfactant" means a surfactant that is adsorbed (as opposed to fixed, reacted, or bonded) onto the surface of the latex particle. During high-speed printing operations, nonreactive surfactants are typically desorbed or stripped off of the latex particle surface, unless the latex particle surface exhibits favorable conditions, such as a low dielectric constant. The definition of reactive surfactant and nonreactive surfactant can be more fully appreciated with reference to the descriptions and examples contained hereafter.

Bulk or surface dielectric constants, bulk densities, and glass transition temperatures of latex copolymeric particles can be predicted using commonly knolwn properties and values for homopolymers. Such predictions can be made in accordance with accepted Bicerano correlations, as described in *Predictions of Polymer Properties*, Bicerano, Jozef, Marcel Dekker, Inc., New York, N.Y., 1996, the contents of which are incorporated herein by reference.

More specifically, from these values, the bulk or surface dielectric constant, bulk density, and glass transition temperature of latex copolymers formed by copolymerization of any combination of monomers may be predicted.

When referring to dielectric constant values, surface dielectric constant values will be used, as the surface dielectric constant values account for both single material latex copolymer particles as well as core-shell, inverse core-shell, and composite latex copolymer particles.

It is understood that the surface dielectric constant of a latex particle is of primary concern in situations where a nonreactive surfactant is being used to provide dispersion stability. Thus, in alternative embodiments of the invention, nonreactive surfactants having a dielectric constant closely matched to the dielectric constant of the latex particle can be used The latex particles of the present invention improve the high drop frequency printability of latex dispersions through the use of one or more reactive surfactant(s) that are covalently bonded to the latex particle surface. The latex can be incorporated into ink jet inks and comprises an emulsion polymerization product of a blend of monomers that collectively provide dispersion and thermal-shear stability in an ink jet pen while maintaining good room temperature film-forming properties when printed. Unlike traditional latex particles having non-reactive surfactants adsorbed to the latex surface, the latex particles of the present invention include reactive surfactants that covalently bind on the latex surface and which remain on the particle surface during and following drop ejection. The resulting latexes that are synthesized with the reactive surfactant show dramatic improvement in freqcel performance when compared to latexes that are stabilized with absorptive (non-reactive) surfactants.

Like non-reactive surfactants, reactive surfactants are molecules that typically have a long hydrophobic segment and a short ionizable and/or polar group. The hydrophobic segment preferentially absorbs onto the surface of the latex particle during and following particle polymerization. The hydrophilic group extends into the normally aqueous solution phase and thereby provides a steric barrier against particle coagulation. Unlike their non-reactive counterparts, reactive surfactants additionally contain a reactive group on the hydrophobic segment that is capable of covalently bonding to the latex surface. In a preferred embodiment of the present invention, the reactive group is of the same reactive species as that found in the latex monomer(s) so that the surfactant reacts more readily into the latex surface during the latex polymerization reaction. It is understood that the reactive surfactant may also bind to the latex surface through other and subsequent reaction means.

Suitable reactive surfactants for use with the present invention include any surfactants having a reactive group on the hydrophobic segment which are capable of covalently bonding to the surface of a latex particle. Preferably, the length and composition of the hydrophobic segment of the reactive surfactant is selected to substantially correspond to the surface chemistry and the rheological needs of the latex particle. One such representative hydrophobic segment is a $C_{10-20}$ alkyl chain. The hydrophilic group may be anionic, cationic, or non-ionic. Suitable anionic functional groups include, for example, sulfonate, phosphonate, and carboxylate ions. Suitable cationic functional groups include, for example, ammonium ions. Suitable non-ionic surfactants typically include surfactants exhibiting ethoxy group hydrophilicity.

The reactive group can be selected based on the reactive species of the latex monomer. For example, acrylate reactive groups could be selected as reactive groups for use with lattices that are polymerized via vinyl, acrylic and styrenic monomers. A representative reactive surfactant for such a reaction is MAXEMUL™ 6106 (available from Uniquema), which has both phosphonate ester and ethoxy hydrophilicity, a nominal $C_{18}$ alkyl chain with an acrylate reactive group. Other representative reactive surfactants with phosphate ester functionalities suitable for such reactions include, but are not limited to, MAXEMUL™ 6112, MAXEMUL™ 5011, MAXEMUL™ 5010 (all available from Uniquema). Alternative reactive surfactants suitable for use with various embodiments of the present invention include polyoxyethylene alkylphenyl ether ammonium sulfate (available from Montello, Inc. as HITENOL BC-10™, HITENOL BC-1025™, HITENOL BC-20™, HITENOL BC-2020™, HITENOL BC-30™), polyoxyethylene alkylphenyl ether (available from Montello, Inc. as NOIGEN RN-10™, NOIGEN RN-20, NOIGEN RN-30, NOIGEN RN-40™, and NOIGEN RN-5065™), sodium allyloxy hydroxypropyl sulfonate (available from Rhodia as SIPOMER COPS-1™), alkenyl-functional nonionic surfiners, allyl methoxy triethylene glycol ether, sodium methallyl sulfonates, sulfopropyl acrylate, vinyl sulfonate, vinyl phosphate, monosodium ethylsulfonate monododecyl maleate, sorbitol acrylate, sorbitol methacrylate, perfluoro heptoxy poly(propyloxy) methacrylate, phenoxyl poly(ethyleneoxy acrylate, phenoxyl poly (ethyleneoxy) methacrylate, nonyl phenoxy poly (ethyleneoxy) crotanate, nonyl phenoxy poly (ethyleneoxy) fumarate, nonyl phenoxy poly (ethyleneoxy) acrylate, nonyl phenoxy poly (ethyleneoxy) methacrylate, mono dodecyl maleate, and allylsulfosuccinate derivatives (such as TREM LT-40™ (available from Henkel)). In particular embodiments of the invention, where applicable, the reactive surfactant will include 1 to 40 ethyleneoxy or propyloxy units.

In one embodiment of the invention, the latex particles of the present invention have a bulk density from 0.90 g/cm$^3$ to 1.10 g/cm$^3$ and/or a surface dielectric constant from 2.0 to 3.0. These latexes include one or more reactive surfactant(s) covalently bonded to the surface of the latex particles. The latexes can be used in ink-jet inks, or with other predominantly water based compositions.

An ink-jet ink is also provided that can comprise effective amounts of an ink vehicle; a colorant admixed in the ink vehicle; latex particles dispersed in the ink vehicle; and one or more reactive surfactant(s) covalently bonded to the surface of the latex particles. In a particular embodiment of the invention, the latex particles can have a bulk density from 0.90 g/cm$^3$ to 1.10 g/cm$^3$.

Another ink-jet ink that can be formulated in accordance with embodiments of the present invention can comprise effective amounts of an ink vehicle, a colorant admixed in the ink vehicle, and latex particles dispersed in the ink vehicle. The latex particles have a surface dielectric constant from 2.0 to 3.0 and include one or more reactive surfactant(s) covalently bonded to the surface of the latex particle. In an alternative embodiment of the invention, the latex particles can have a bulk density from 0.90 g/cm$^3$ to 1.10 g/cm$^3$ and a surface dielectric constant from 2.0 to 3.0.

In yet another embodiment, another ink-jet ink can comprise effective amounts of an ink vehicle having a liquid density, a colorant admixed in the ink vehicle, latex particles dispersed in the ink vehicle, and one or more reactive surfactant(s) covalently bonded to the latex particle surface. The latex particles have a bulk density from substantially the same as the liquid density to 0.1 g/cm$^3$ greater than the liquid density.

In accordance with particular embodiments of the present invention, low density polymers can primarily comprise hydrocarbon chains and rings that tend to be more hydrophobic, and have a lower dielectric constant. Thus, three features of the invention include physical properties related to density, hydrophobicity, and dielectric constant. Use of one or more reactive surfactants as a substitute for, or in addition to, the use of non-reactive surfactants can be employed to assure that the surfactant (i.e. the covalently bonded reactive surfactant) remains on the latex particle surface when more polar monomers are used in the formation of the latex particles.

With specific reference to surface dielectric constant, the surface of the latex particles prepared in accordance with embodiments of the present invention can have a room temperature surface dielectric constant from 2.0 to 3.0. In another embodiment, the surface dielectric constant can be from 2.3 to 2.8. A surface dielectric constant of from 2.0 to 3.0 generally provides a sufficient degree of surface hydrophobicity to provide added protection against non-reactive surfactant stripping under the high shear conditions that occur during drop ejection, particularly when non-reactive surfactants are used in combination with reactive surfactants during latex particle formation. A latex surface dielectric constant as low as 2.0 can be achieved by incorporating monomers having a very low dielectric constant. Examples of such monomers include fluorosilicons or fluorocarbons.

Adequate reactive surfactant bonding can be obtained in order to minimize or eliminate problems with latex printability and dispersion, which are often associated with latex-containing ink-jet inks. Further, such formulations can prevent both latex floatation and settling within an aqueous-based ink vehicle.

With respect to bulk density, as described, an ink-jet compatible latex polymer in accordance with embodiments of the present invention can have a bulk density ($\rho$) from 0.90 g/cm$^3$ to 1.10 g/cm$^3$. In another embodiment, the bulk density can be from 1.02 g/cm$^3$ to 1.05 g/cm$^3$. This property can protect against latex particle settling independent of latex surface or dispersion chemistry.

The overall shear stability of the latex particles is further improved by incorporating cross-linkers in to the polymers. Cross-linkers can be any monomers with polymerizable di- or polyfunctional groups. Preferred cross-linkers include ethylene glycol dimethacrylate, pentaerythritol tetraacrylate, ethyleneglycol dimethacrylamide, divinyl benzene, or other monomers with polymerizable di- or polyfunctional groups. Cross-linkers are utilized in a range of 0.1%–5% by weight of the total composition. This relatively narrow range of cross linking can aid in maintaining the integrity of latex under the high thermal shear conditions that occur during thermal ink jet printing, while not adversely impacting its room temperature film-forming properties.

The latex particles and ink-jet ink formulations described herein, in part, result from the discovery that latex particles, e.g., of 200 nm to 300 nm in size, having bulk densities greater than 1.10 g/cm$^3$, tend to settle out of or significantly layer in dilute (0.25 wt % solids) aqueous test tube solutions within three months. Latex particles of lower density do not show visible precipitate or layering within several years in the same tests. Conversely, if the bulk density of a given latex particle in water is too low, the latex particle can float to the top of an aqueous solution.

In another embodiment of the invention, the bulk density range can be modulated such that the bulk density is in a range slightly above or below the liquid component density of the predominantly water-based ink vehicle. Within a relatively narrow density band above or below this level, Brownian energy can prevent latex flotation or settling. As ink vehicle fluid densities of predominantly water-based inkjet inks are typically about 1.02 g/cm³, bulk densities of latex particles that are approximately the same to slightly higher or lower can be included with little to no settling or flotation over a period of years. Alternatively, low density latex polymers having at least one ring containing monomer can be used to further improve the print film durability of the latex. According to this particular aspect of the invention, the latex can contain a blend of alkane (e.g., hexyl methacrylate) and ring-based (e.g., styrene) monomers to adjust the thermal glass transition temperature for print film formation at a given temperature. The use of these or other similar polymers can provide the above-mentioned benefits without a reduction in print film durability.

The glass transition temperature of the polymer can fall in the range of about $0° C.<T_g<50° C$. In an alternative embodiment, the glass transition temperature range can be from $10° C.<T_g<40° C$. These temperature ranges can allow for room temperature film formation of an ink without process or pen induced particle agglomeration.

Generally, the latex particles of the present invention can be prepared by mixing monomers together to form a monomer mixture. A surfactant or surfactants is (are) then added to the monomer mixture and sheared to form an emulsion. The surfactant(s) may include a reactive surfactant, a nonreactive surfactant, or a combination of reactive and nonreactive surfactants. In one embodiment of the invention, nonreactive surfactants can be used to form the latex particle, and reactive surfactants can be used, either in concert or added in a second step. Alternatively, polymerization can be carried out as a soap-free polymerization, with a reactive surfactant being added near the end of polymerization.

More specifically, the latex particles of the present invention can be prepared through conventional free radical addition of a monomer mixture through emulsion polymerization. Suitable monomers are included in U.S. Pat. No. 6,057,384, the contents of which are incorporated herein by reference. The latex can be dispersion stabilized through incorporation of a monomer or monomers that promote latex surface charge. Such monomers are represented by acrylic acid, methacrylic acid, vinyl benzoic acid, and methacryloyloxyethylsuccinate. These charge-forming monomers typically comprise from 0.5 wt % to 20 wt % of the latex particle (or the surface of the latex particle if a core-shell latex). In a more detailed embodiment, the charge-forming monomers can be present at from 3 wt % to 10 wt % of the monomer mix. These charge-forming monomers can be neutralized after latex polymerization to form salts. Such salts may be formed through the reaction of a latex carboxylic acid group(s) with potassium hydroxide. Other known neutralization compositions can also be used, as is known in the art.

The latexes prepared in accordance with the principles disclosed herein can be shear stabilized through incorporation of from 0.01 wt % to 20 wt % addition of a reactive surfactant capable of covalently bonding to the surface of the latex particle. The reaction between the reactive surfactant and the latex particle surface maintains the dispersion stability of the latex under the high thermal shear conditions of thermal ink-jetting. Use of the latex particles described herein reduce or eliminate problems associated with freqcel, decap, and decel.

A typical ink vehicle formulation that can be used with the latexes described herein can include water, and optionally, one or more co-solvents present in total at from 0 wt % to 30 wt %, depending on the pen architecture. Further, one or more non-ionic, cationic, and/or anionic surfactant can be present, ranging from 0 wt % to 5.0 wt %. The balance of the formulation can be purified water, or other vehicle components known in the art, such as biocides, viscosity modifiers, materials for pH adjustment, sequestering agents, preservatives, and the like. Typically, the ink vehicle is predominantly water.

Classes of co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

In addition to the reactive surfactants described above, one or more non-reactive surfactants can also be used, as are known by those skilled in the art of ink formulation, and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0 wt % to 5.0 wt %. It is to be noted that the nonreactive surfactant that is described as being usable in the ink vehicle is not the same as the reactive surfactant that is described as being covalently bonded to the surface of the latex particle.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

With respect to the colorant, an effective amount of either pigment and/or dye can be used. In one embodiment, the colorant can be present at from 0.5 wt % to 10.0 wt %.

EXAMPLES

The following examples are detailed descriptions of methods of preparing and using the latex particles of the present invention. The detailed descriptions fall within the scope of, and serve to exemplify, the more general descriptions set forth above. The examples are presented for illustrative purposes only and are not intended as restrictions on the scope of the invention.

Example 1

Preparation of Latex Particles

Methyl methacrylate (102.5 g), hexyl acrylate (120 g), mono-methacryloyl succinate (25 g), ethylene glycol dimethacrylate (2.5 g), and isooctylthioglycolate (1.0 g) were mixed together in an addition funnel to form a monomer mixture. Water (85 ml) and 30% Rhodafac (nonreactive) surfactant (20.8 g) were added to the monomer mixture and sheared gently to form an emulsion. At the same time, 725 ml of water were heated to 90° C. in a reactor. An initiator solution was separately prepared by dissolving potassium persulfate (0.87 g) in 100 ml of water. The initiator solution was added dropwise to the reactor at a rate of 3 ml/min. with stirring. The monomer emulsion was simultaneously added dropwise to the reactor, starting 3 minutes after the start of initiator addition and over a period of 30 minutes. The reaction mixture was maintained at 90° C. for 2 hours with stirring following addition of the additives. The reaction mixture was allowed to cool to 50° C. at which time 23 g. of 17.5% potassium hydroxide solution was added to bring the pH of the reaction mixture to 8.5. The reaction mixture was filtered with a 200 mesh filter to obtain stable polymer particles with an average size of 230 nm.

Example 2

Preparation of Latex Particles Having Covalently Bonded Reactive Surfactant

The synthesis of Example 1 was repeated, with the exception that 0.62 g of MAXEMUL™ 6106 reactive surfactant was substituted for the Rhodafac solution, and 105 ml of water was used instead of 85 ml. The emulsion was added over a period of 32 minutes. The resultant latex had a particle size of 320 nm.

Example 3

Preparation of Ink Jet Ink Formulations

The latex particles of Examples 1 and 2 were each separately formulated into identical aqueous ink jet ink formulations. The ink formulations generally comprised 4 wt % latex, 3 wt % self-dispersed pigment, 6 wt % 2-pyrrolidinone, 4 wt % 1,2 hexanediol, 3 wt % LEG-1, 5 wt % glycerol and 2 wt % of miscellaneous dispersants and humectants in water.

Example 4

Print Performance Comparison

The ink jet ink formulations of Example 3 (which include the latex particles of Examples 1 and 2) were printed on standard paper over a broad drop frequency range using a Hewlett-Packard thermal ink jet pen. Freqcel performance was evaluated at frequency ranges of 200 Hz to 20 kHz. The ink jet formulations containing the latex particles of Example 1 (nonreactive surfactant) exhibited poor print quality and a reduction in ink drop ejection velocity with increased pen firing frequency. The ink jet formulations containing the latex particles of Example 2 (reactive surfactant) exhibited good print quality and no perceptible reduction in ink drop ejection velocity with increased pen firing frequency.

Example 5

Preparation of Latex Particles Having Reactive and Nonreactive Surfactants

The synthesis example 1 was repeated, with the exception that MAXEMUL™ 6106 (0.625 g) and 30% Rhodafac (18.72 g) were used as reactive and non-reactive surfactants, respectively, to emulsify the monomer mixture. The addition of emulsion took 42 minutes and the initiator solution was added at the rate of 2 ml/min. The resultant latex had a particle size of 240 nm.

Example 6

Preparation of Latex Using Reactive Surfactant for Emulsification and Surface Addition MAXEMUL 6106 (0.8 g) was dissolved in styrene (38 g), hexyl methacrylate (138.7 g), methacrylic acid (11.4 g), ethylene glycol dimethacrylate (1.9 g) and isooctylthio glycolate (0.8 g) to form a monomer mixture. The monomer mixture was emulsified with water (68 ml). Meanwhile water (650 ml) was heated to 90° C. in a reactor. An initiator solution of potassium persulfate (1 g) in water (55 ml) was prepared. The initiator solution was added to the reactor at the rate of 2 ml/min. After 3 minutes into the addition of initiator solution, the emulsion was added over a period of 24 minutes. Immediately, a solution of MAXEMUL 6106 (7.2 g) in styrene (2 g), hexyl methacrylate (7.3 g), methacrylic acid (0.6 g) and ethylene glycol dimethacrylate (0.1 g) was added to the reactor. The reactor was maintained at 90° C. for 1.75 h and then treated with 0.5 g of 30% hydrogen peroxide. The reactor was maintained at 90° C. for another 0.25 h and cooled to ambient temperature. The latex was neutralized with potassium hydroxide solution to a pH of 8.5 and filtered with 185 mesh filter to obtain latex of particle size 194 nm. Most of the reactive surfactant is present on the surface of the particle.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

The invention claimed is:

1. An ink-jet ink, comprising effective amounts of:
   a) an aqueous ink vehicle;
   b) a colorant admixed in the ink vehicle;
   c) latex particles dispersed in the ink vehicle, wherein the latex particles comprise a cross linker; and
   d) at least one reactive surfactant covalently bonded to the surface of said latex particles, wherein the at least one reactive surfactant is selected from the group consisting of sodium allyloxy hydroxypropyl sulfonate allyl methoxy triethylene glycol ether, sodium methallyl sulfonates, monosodium ethylsulfonate monododecyl maleate, nonyl phenoxy poly (ethyleneoxy) crotanate, nonyl phenoxy poly (ethyleneoxy) fumarate, and mono dodecyl maleate.

2. The ink-jet ink of claim 1, wherein said latex particles have a bulk density from 0.90 g/cm$^3$ to 1.10 g/cm$^3$.

3. The ink-jet ink of claim 1, wherein said latex particles have a surface dielectric constant from about 2.0 to about 3.0 at room temperature.

4. The ink-jet ink of claim 1, further comprising an effective amount of a nonreactive surfactant adsorbed to the surface of said latex particles.

5. The inkjet ink of claim 1, wherein the latex particles have a glass transition temperature from 0° C. to about 50° C.

6. The ink-jet ink of claim 1, wherein said latex particles are copolymers and include at least one ring-containing monomer.

7. The ink-jet ink of claim 1, wherein said colorant is a pigment.

8. The ink-jet ink of claim 1, wherein said colorant is a dye.

9. A latex particle having at least one reactive surfactant covalently bonded to a surface of said latex particle, said latex particle having a bulk density from 0.90 g/cm$^3$ to 1.10 g/cm$^3$ and a surface dielectric constant from 2.0 to 3.0 at room temperature and wherein the at least one reactive surfactant is selected from the group consisting of sodium allyloxy hydroxypropyl sulfonate, alkenyl-functional nonionic surfmers, allyl methoxy triethylene glycol ether, sodium methallyl sulfonates, monosodium ethylsulfonate monododecyl maleate, nonyl phenoxy poly (ethyleneoxy) crotanate, nonyl phenoxy poly (ethyleneoxy) fumarate, and mono dodecyl maleate.

10. The latex particle of claim 9, wherein said bulk density is from 1.02 g/cm$^3$ to 1.05 g/cm$^3$.

11. The latex particle of claim 9, wherein said surface dielectric constant is from 2.3 to 2.8 at room temperature.

12. The latex particle of claim 9, wherein said latex particle has a nonreactive surfactant adsorbed to the surface of said latex particle.

13. A latex particle as in claim 9, wherein the latex particle comprises from 0.5 wt % to 5 wt % cross-linker.

14. A latex particle as in claim 9, wherein the latex particle has a glass transition temperature of from 0° C. to 50° C.

15. An ink-jet ink, comprising effective amounts of:
   a) an aqueous ink vehicle having a predetermined liquid density;
   b) a colorant admixed in the ink vehicle;
   c) latex particles dispersed in the ink vehicle, said latex particles having a bulk density from the same as the liquid density to 0.1 g/cm$^3$ less than to 0.1 g/cm$^3$ greater than the liquid density; and
   d) at least one reactive surfactant covalently bonded to the surface of said latex particles, wherein the at least one reactive surfactant is selected from the group consisting of sodium allyloxy hydroxypropyl sulfonate, alkenyl-functional nonionic surfmers allyl methoxy triethylene glycol ether, sodium methallyl sulfonates, monosodium ethylsulfonate monododecyl maleate, nonyl phenoxy poly (ethyleneoxy) crotanate, nonyl phenoxy poly (ethyleneoxy) fumarate, and mono dodecyl maleate.

16. An ink-jet ink as in claim 15, wherein the bulk density is from 0.90 g/cm$^3$ to 1.10 g/cm$^3$.

17. An ink-jet ink as in claim 15, wherein the latex particles have a surface dielectric constant from 2.0 to 3.0 at room temperature.

18. An ink-jet ink as in claim 15, further comprising at least one nonreactive surfactant adsorbed to the surface of said latex particles.

19. An ink-jet ink. comprising effective amounts of:
   a) an aqueous ink vehicle;
   b) a colorant admixed in the ink vehicle;
   c) latex particles dispersed in the ink vehicle, wherein said latex particles have a surface dielectric constant from about 2.0 to about 3.0 at room temperature; and
   d) at least one reactive surfactant covalently bonded to the surface of said latex particles, wherein the at least one reactive surfactant is selected from the group consisting of sodium allyloxy hydroxypropyl sulfonate, alkenyl-functional nonionic surfmers allyl methoxy triethylene glycol ether, sodium methallyl sulfonates, monosodium ethylsulfonate monododecyl maleate, nonyl phenoxy poly (ethyleneoxy) crotanate, nonyl phenoxy poly (ethyleneoxy) fumarate, and mono dodecyl maleate.

20. The ink-jet ink of claim 19, wherein the latex particles further comprise a cross linker.

* * * * *